(12) United States Patent
LaFrance-Linden

(10) Patent No.: US 8,196,117 B2
(45) Date of Patent: Jun. 5, 2012

(54) MERGING SAMPLE BASED PROFILING DATA

(75) Inventor: David LaFrance-Linden, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1555 days.

(21) Appl. No.: 11/649,464

(22) Filed: Jan. 3, 2007

(65) Prior Publication Data

US 2008/0162524 A1 Jul. 3, 2008

(51) Int. Cl.
- G06F 9/44 (2006.01)
- G06F 9/45 (2006.01)
- G06F 15/173 (2006.01)
- G06F 11/00 (2006.01)

(52) U.S. Cl. ........ 717/130; 717/127; 717/158; 709/224; 714/38; 714/45

(58) Field of Classification Search ........................ None
See application file for complete search history.

(56) References Cited

U.S. PATENT DOCUMENTS

| | | | |
|---|---|---|---|
| 6,539,339 B1 * | 3/2003 | Berry et al. | 702/186 |
| 6,961,930 B1 * | 11/2005 | Waldspurger et al. | 717/141 |
| 7,380,241 B2 * | 5/2008 | Burdick et al. | 717/136 |
| 7,546,598 B2 * | 6/2009 | Blumenthal et al. | 718/1 |
| 7,644,397 B2 * | 1/2010 | Warren et al. | 717/131 |
| 2003/0078736 A1 * | 4/2003 | Weng et al. | 702/19 |
| 2006/0230390 A1 * | 10/2006 | Alexander et al. | 717/130 |
| 2006/0277307 A1 * | 12/2006 | Bernardin et al. | 709/226 |
| 2007/0061626 A1 * | 3/2007 | Nelson et al. | 714/38 |
| 2007/0162896 A1 * | 7/2007 | Geva et al. | 717/130 |
| 2007/0214342 A1 * | 9/2007 | Newburn et al. | 712/216 |
| 2008/0127149 A1 * | 5/2008 | Kosche et al. | 717/158 |
| 2008/0288926 A1 * | 11/2008 | Cain et al. | 717/128 |

* cited by examiner

*Primary Examiner* — Isaac Tecklu

(57) ABSTRACT

In one embodiment, a computer system comprises one or more processors, and a memory module communicatively connected to the one or more processors. The memory module comprises logic instructions stored on a computer readable medium which, when executed on the one or more processors configure the one or more processors to normalize data from a first data set comprising sample based profiling data to form a first normalized data set, normalize data from a second data set comprising sample based profiling data to form a second normalized data set, combine the first normalized data set and the second normalized data set to form a merged data set, and present a portion of the merged data set on a user interface.

15 Claims, 7 Drawing Sheets

MERGING SAMPLE BASED PROFILING DATA

BACKGROUND

Computer systems may include performance profiling modules, which collect performance data pertaining to computer performance. For example, the performance profiling modules may monitor for one or more events. The performance data may be recorded in a suitable memory medium, e.g., a data file or a database, and may be analyzed by a performance analysis tool or presented to a user via a suitable user interface.

Some performance profiling modules collect performance data using sampling techniques, rather than continuous monitoring techniques. Performance profilers may associate two parameters for each event being monitored: an interval and an active fraction. The interval parameter records the number of events between samples. The active fraction parameter records how often the event was monitored. For example, events may be monitored for only a fraction of the time because more events were requested than hardware monitoring capabilities enable to be monitored, requiring some form of time-multiplexed sharing of the hardware resources.

Profiling modules may run monitoring sessions of varying time durations, and may monitor different sets of parameters during different monitoring sessions. In this event, the data sets collected must be merged in a manner that gives semantically meaningful presentations of the samples.

DETAILED DESCRIPTION

Described herein are exemplary system and methods for merging sample-based profiling data which may be used in conjunction with a computer system. In embodiments, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
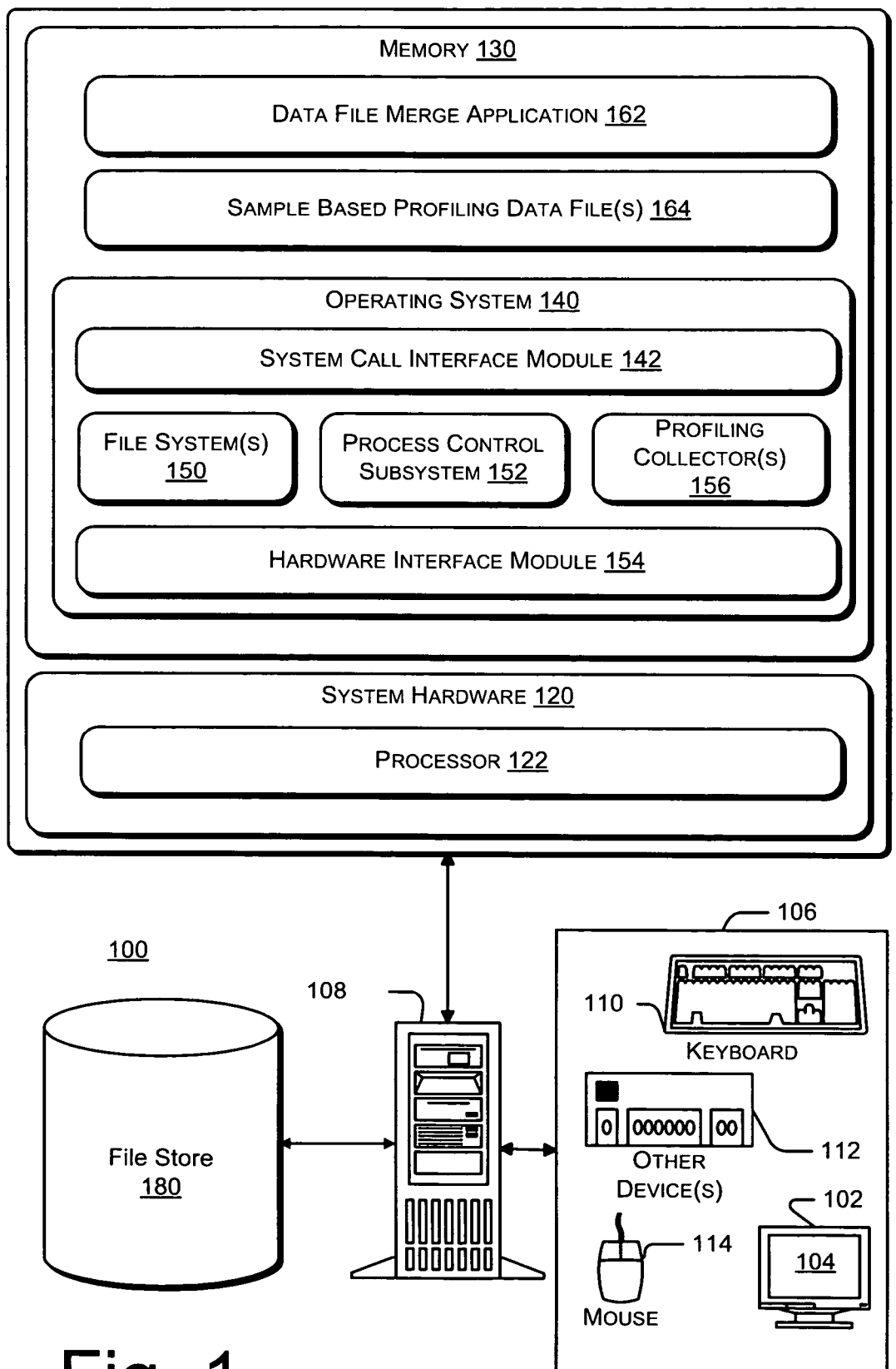
FIG. 1 is a schematic illustration of one embodiment of a computing system adapted to merge sample based profiling data.

FIG. 1 is a schematic illustration of one embodiment of a computing system adapted to implement hybrid database query caching. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes one or more file systems 150 that manage files used in the operation of computer 108 and a process control subsystem 152 that manages processes executing on computer 108. Operating system 140 further includes a system call interface module 142 that provides an interface between the operating system 140 and one or more application modules. A profiling collector 156, which collects parameters relating to the performance of the computing system 100. In some embodiment the profiling collector(s) 156 may be implemented at the application level or within the kernel level of the operating system 140.

In operation, one or more application modules and/or libraries executing on computer 108 make calls to the system call interface module 142 to execute one or more commands on the computer's processor. The system call interface module 142 invokes the services of the file system(s) 150 to manage the files required by the command(s) and the process control subsystem 152 to manage the process required by the command(s). The file system(s) 150 and the process control subsystem 152, in turn, invoke the services of the hardware interface module 154 to interface with the system hardware 120. System hardware 120 includes, among other items, a processor 122.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In some embodiments, data file merge application 162 includes logic instructions stored in memory module 130 which, when executed, configure the processor 122 to implement operations to merge two or more sampling based profiling data files 164.

Figure 2:
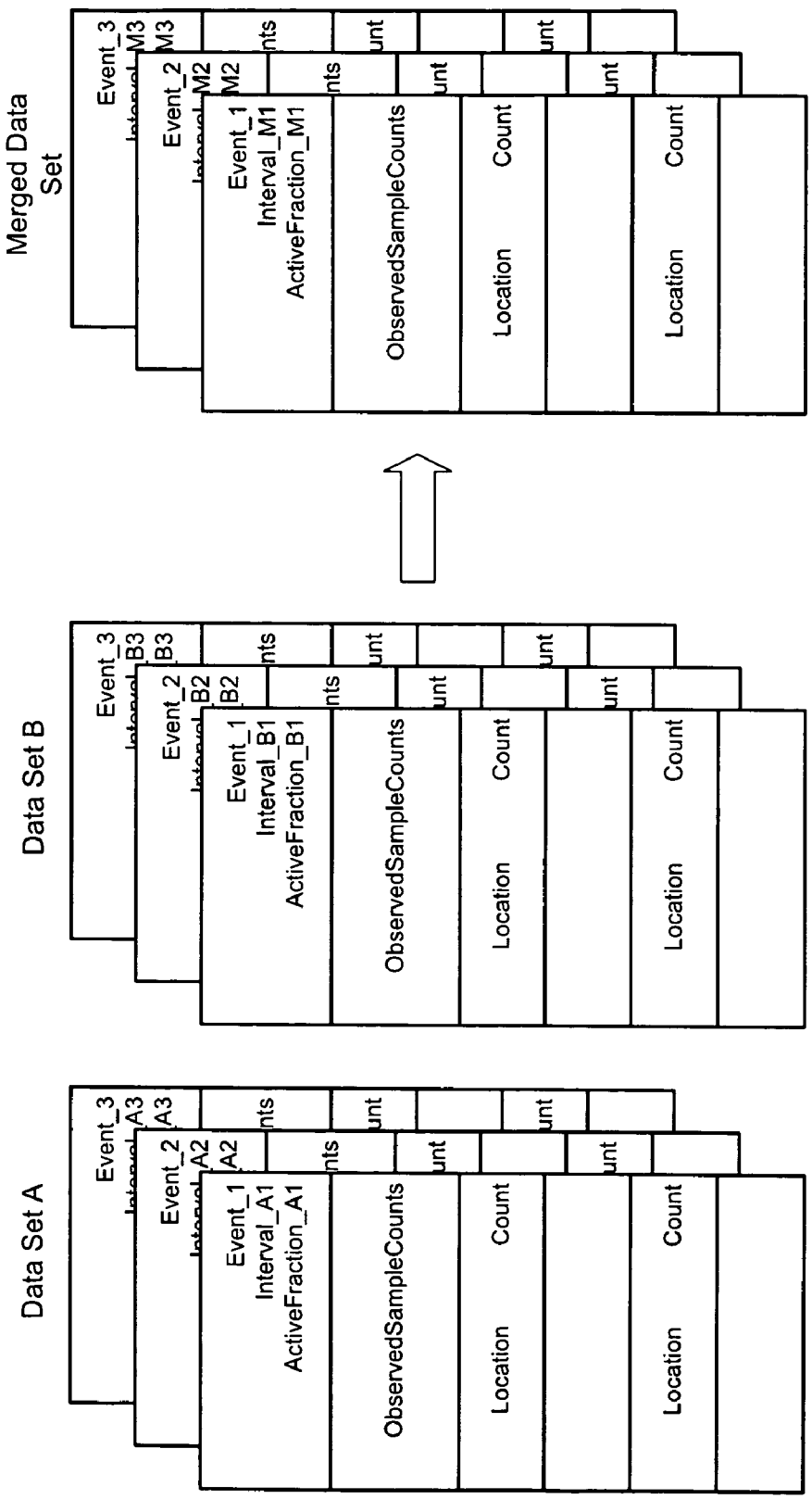
FIG. 2 is a schematic illustration of merging sample based profiling data according to one embodiment.

FIG. 2 is a schematic illustration of merging sample based profiling data according to one embodiment. Referring to FIG. 2, profiling collector(s) 154 may record performance parameters in one or more data files, represented in FIG. 2 by Data Set A and Data Set B. As described above, when sampling events, performance profilers commonly associate an interval and an active fraction for each event being profiled. In addition, a profiler may record information pertaining to the location monitored and a count for the event at the location. This information may be recorded in a suitable memory module, e.g., a data file or a database. Thus, in FIG. 2 Data Set A records sampling data from a first sampling session, while Data Set B records sampling data from a second sampling session. These, and possibly more data sets may need to be merged into a Merged Data Set, which gives an overall image of the performance of computer system 100 over time. Merging Data Set A and Data Set B may require the data in the respective data sets to be normalized in a way such that the merged data set includes meaningful information.

Figure 3:
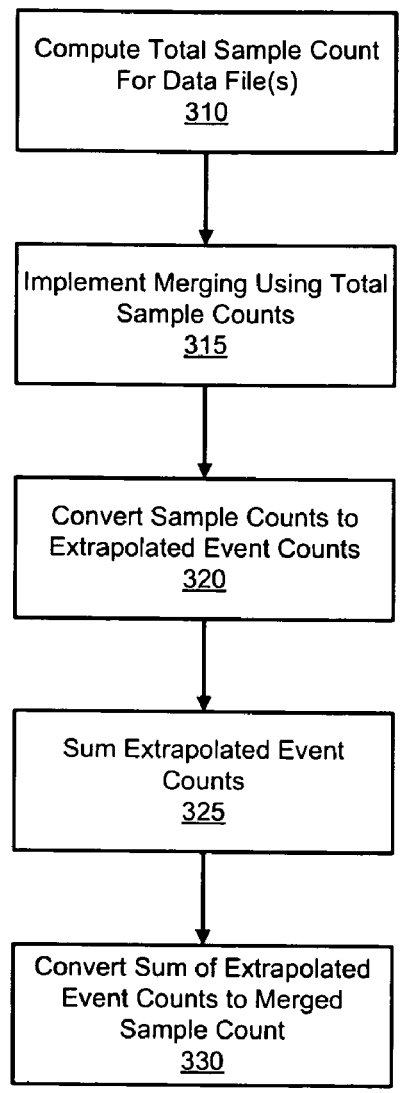
FIG. 3 is a flowchart illustration operations in a method to merge sample based profiling data according to one embodiment.

FIG. 3 is a flowchart illustrating high-level operations in a method to merge sample based profiling data according to one embodiment. Referring to FIG. 3, at operation 310 a total sample count is computed for the data files to be merged. In one embodiment, a total sample count may be computed as the sum of the location-based sample counts from each data file being merged. At operation 315 the merging process is implemented using the total sample counts computed in operation 310.

As data for the merged database is constructed, the sample count for a location in the merged database is computed. Thus, at operation 320 the sample counts are converted to extrapolated event counts. In one embodiment, sample counts are converted to the event counts using the following formula:

$$\text{EventCount} = \text{SampleCount} * \text{Interval} \qquad \text{Equation (1)}$$

The following relationships then apply:

$$\text{ExtrapolatedSampleCount} = \text{SampleCount}/\text{ActiveFraction} \qquad \text{Equation (2)}$$

$$\text{ExtrapolatedEventCount} = \text{EventCount}/\text{ActiveFraction} \qquad \text{Equation (3a)}$$

$$\text{ExtrapolatedEventCount} = \text{ExtrapolatedSampleCount} * \text{Interval} \qquad \text{Equation (3b)}$$

The following abbreviations will be applied herein: I for the Interval, AF for the Active Fraction, SC for the sample count, EC for the Event count, ESC for the extrapolated sample count, and EEC for the extrapolated event count.

The above relationships hold for each source database and for the merged database. Thus, for the merged database there are six unknowns (I, AF, SC, EC, ESC, EEC) and three non-redundant equations (Equations 1, 2, and 3, above).

In one embodiment, three of the parameters may be constrained by the following relationships:

$$EEC\_\text{merged} = \text{sum}(EEC\_\text{sources}) \qquad \text{Equation (4)}$$

$$ESC\_\text{merged} = \text{sum}(ESC\_\text{sources}) \qquad \text{Equation (5)}$$

$$SC\_\text{merged} = \text{sum}(SC\_\text{sources}) \qquad \text{Equation (6)}$$

In an alternate embodiment the following constraint may be applied in lieu of (or in addition to) Equation (6):

$$EC\_\text{merged} = \text{sum}(EC\_\text{sources}) \qquad (7)$$

Given the constraints embodied in Equation (4) through Equation (7), the relationships embodied in Equation (1) through may be used to determine the parameters I_merged and AF_merged.

Figure 4:
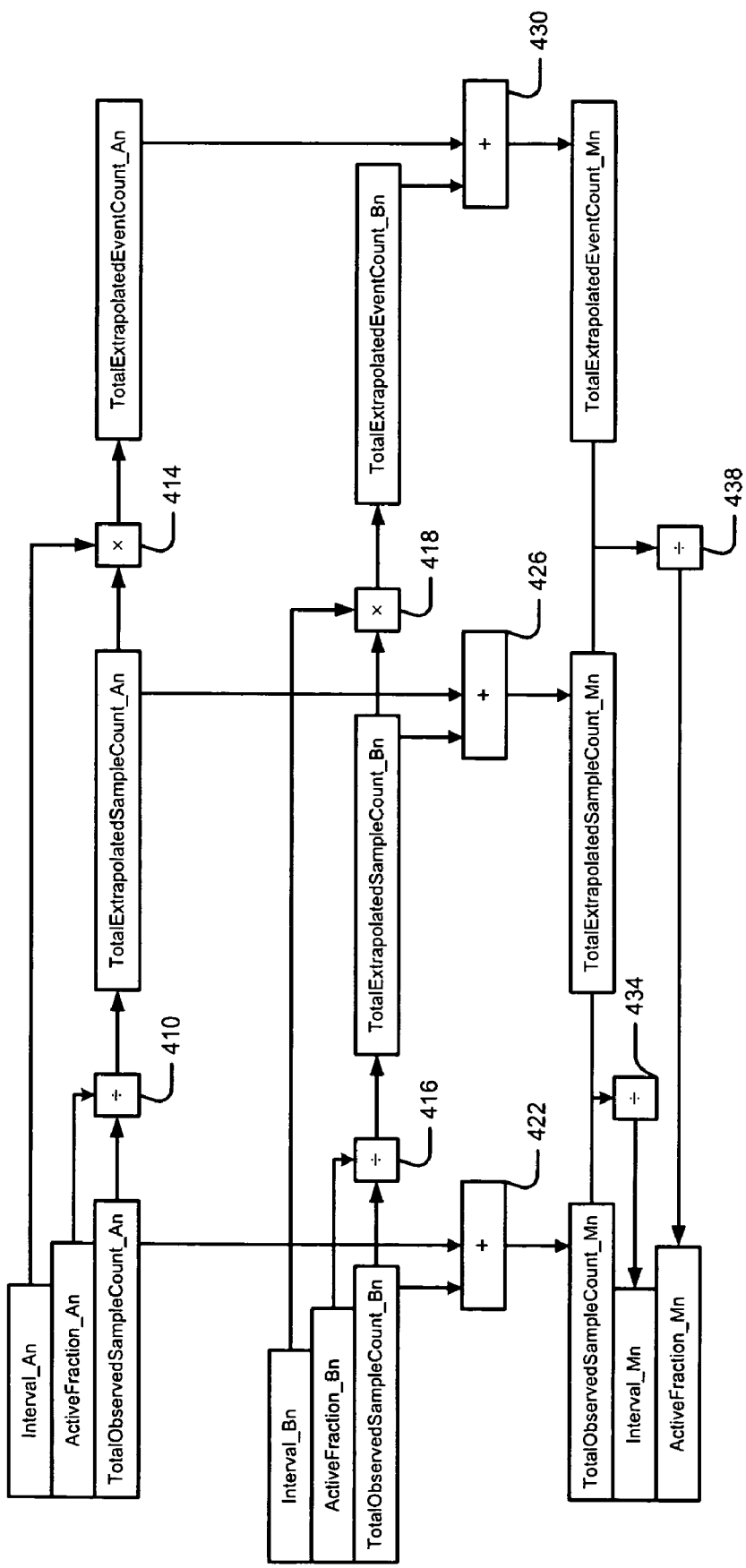
FIG. 4 is a schematic diagram illustrating operations that may be used to sample based profiling data according to one embodiment.

FIG. 4 is a schematic diagram illustrating operations that may be used to sample based profiling data according to one embodiment. In some embodiments, the operations of FIG. 4 are performed for each event (n) to calculate the parameters of a merged database.

Referring to FIG. 4, the TotalObservedSampleCount_An is divided by the ActiveFraction_An in divider 410 to obtain a TotalExtrapolatedSampleCount_An, which is multiplied by the Interval_An in multiplier 414 to obtain the TotalExtrapolatedEventCount_An.

Similarly, the TotalObservedSampleCount_Bn is divided by the ActiveFraction_Bn in divider 416 to obtain a TotalExtrapolatedSampleCount_Bn, which is multiplied by the Interval_Bn in multiplier 418 to obtain the TotalExtrapolatedEventCount_Bn.

The TotalObservedSampleCount_An is added to the TotalObservedSampleCount_Bn in summer 422 to obtain the TotalObservedSampleCount_Mn. The TotalExtrapolatedSampleCount_An is added to the TotalExtrapolatedSampleCount_Bn in summer 426 to obtain the TotalExtrapolatedSampleCount_Mn. The TotalExtrapolatedEventCount_An is added to the TotalExtrapolatedEventCount_Bn in summer 430 to obtain the TotalExtrapolatedEventCount_Mn.

The TotalObserveredSampleCount_Mn is divided by the TotalExtrapolatedSampleCount_Mn in divider 434 to obtain the Interval_Mn. Similarly the TotalExtrapolatedEventCount_Mn is divided by the TotalExtrapolatedSampleCount_Mn to obtain the ActiveFraction_Mn 438.

Figure 5:
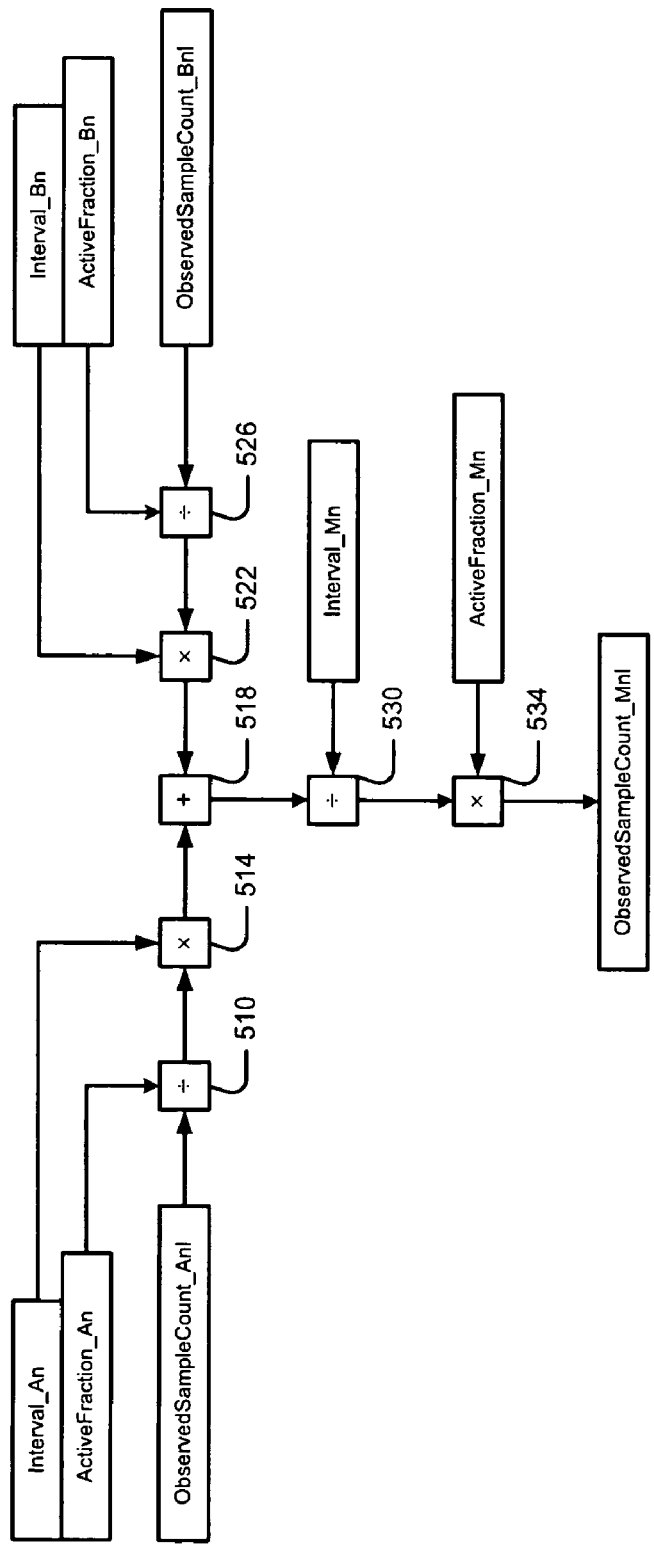
FIG. 5 is a schematic diagram illustrating operations that may be used to sample based profiling data according to one embodiment.

FIG. 5 is a schematic diagram illustrating operations that may be used on sample based profiling data according to one embodiment. In some embodiments, the operations depicted in FIG. 5 may be performed for each event (n), at each location (l) in order to merge the counts at each location.

Referring to FIG. 5, the ObservedSampleCount_Anl is divided by the ActiveFraction_An in divider 510 to obtain the ExtrapolatedSampleCount_Anl, which is multiplied by the Interval_An in multiplier 514 to obtain the ExtrapolatedEventCount_Anl. Similarly, the ObservedSampleCount_Bnl is divided by the ActiveFraction_Bn in divider 526 to obtain the ExtrapolatedSampleCount_Bnl, which is multiplied by the Interval_Bn in multiplier 522 to obtain the ExtrapolatedSampleCount_Bnl.

The ExtrapolatedSampleCount_Anl is added to the ExtrapolatedSampleCount_Bnl in adder 518, and the sum is divided by the IntervalMn in divider 530 to obtain the ExtrapolatedSampleCount_Mnl, which is multipled by the ActiveFraction_Mn to obtain the ObservedSampleCount_Mnl.

Figure 6:
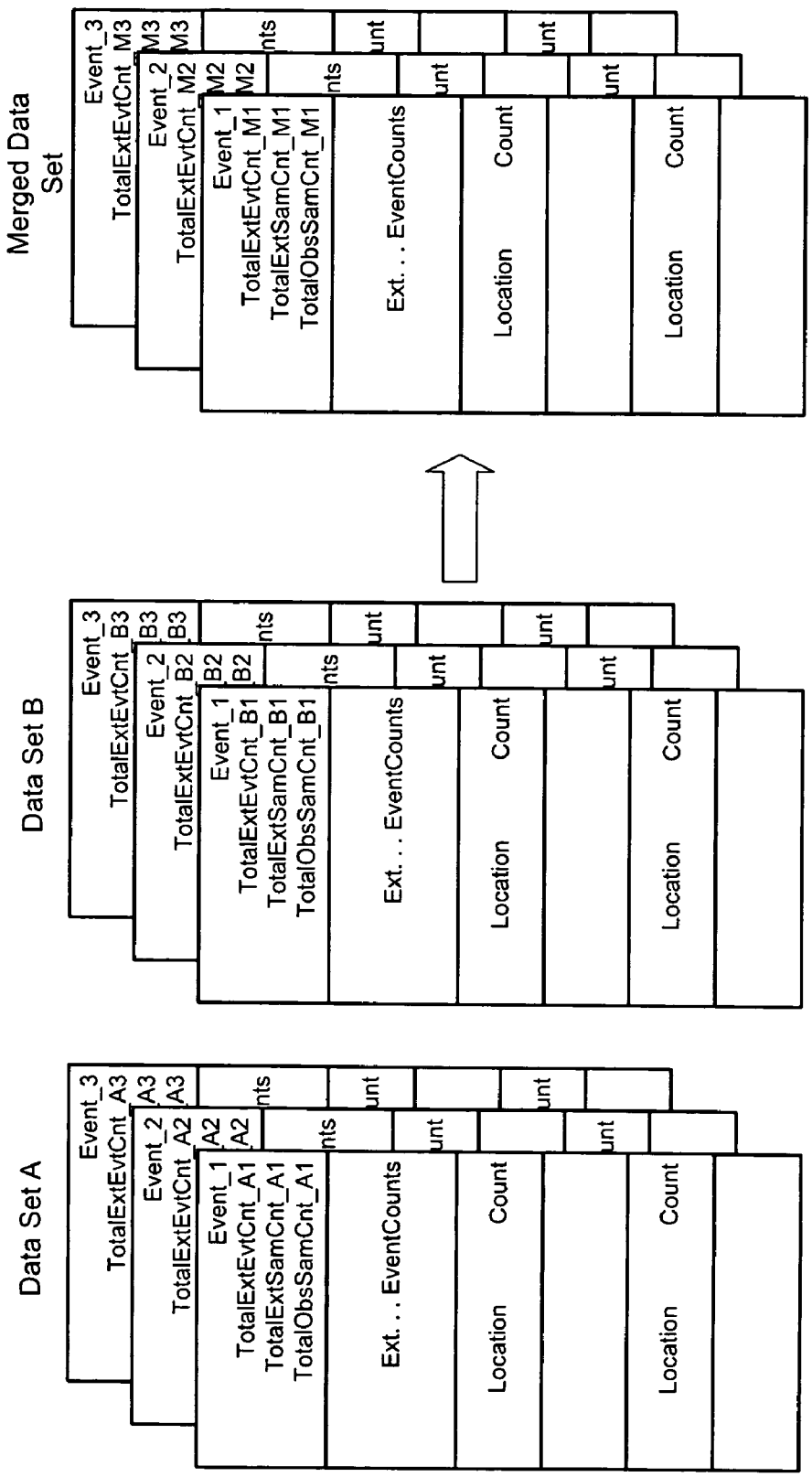
FIG. 6 is a schematic illustration of merging sample based profiling data according to one embodiment.

In another embodiment, data collected by a profiling module may be converted, or normalized, to extrapolated event counts which may be stored in a data file. For example, FIG. 6 is a schematic illustration of merging sample based profiling data according to one embodiment. Referring to FIG. 6, profiling collector(s) 154 may record performance parameters in one or more data files, represented in FIG. 6 by Data Set A and Data Set B. Rather than, or in addition to, storing raw data as depicted in FIG. 2, the data may be converted to extrapolated event counts and associated parameters.

Thus, in the embodiment depicted in FIG. 6, data sets A and B store a total extrapolated event count (TotalExtEvtCnt_An, TotalExtEvtCnt_Bn), a total extrapolated sample count (TotalExtSamCnt_An, TotalExtSamCnt_Bn), and a total observed sample count (TotalObsSamCnt_An, TotalObsSamCnt_Bn) for each event (n). As described above, when sampling events performance profilers commonly associate an interval and an active fraction for each event being profiled; the totals are derived from the interval and active fraction, and the interval and active fraction may be recovered from the totals. In addition, a profiler may record information pertaining to the location monitored and a count for the event at the location. This information may be recorded in a suitable memory module, e.g., a data file or a database. Thus, in FIG. 2 Data Set A records sampling data from a first sampling session, while Data Set B records sampling data from a second sampling session. These, and possibly more data sets may need to be merged into a Merged Data Set, which gives an overall image of the performance of computer system 100 over time. Merging Data Set A and Data Set B may require the data in the respective data sets to be normalized in a way such that the merged data set includes meaningful information.

Figure 7:
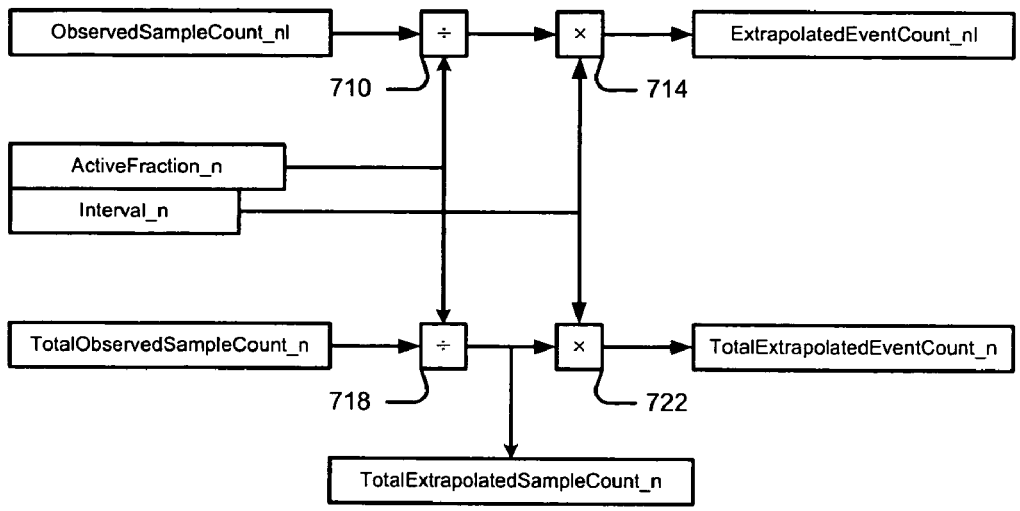
FIG. 7 is a schematic diagram illustrating operations that may be used to sample based profiling data according to one embodiment.

FIG. 7 is a schematic diagram illustrating operations that may be used to sample based profiling data according to one embodiment. In some embodiments, a sample profile collector may use the operations depicted in FIG. 7 to convert sampled events to extrapolated event counts, which may be stored in the data file as depicted in FIG. 6. The operations illustrated in FIG. 7 may be performed for data collected for each event (n) at each location (l) in the computing system.

Referring to FIG. 7, the ObservedSampleCount_nl is divided by the ActiveFraction_n in divider 710 to obtain the ExtrapolatedSampleCount_n, which is multiplied by the Interval_n in multiplier 714 to obtain the ExtrapolatedEventCount_nl. Similarly, the TotalObservedSampleCount_n is divided by the ActiveFraction_n in divider 718 to obtain the TotalExtrapolatedSampleCount_n, which is multiplied by the Interval_n in multiplier 722 to obtain the TotalExtrapolatedEventCount_n. These parameters may be stored in data files, e.g., Data File A and Data File B depicted in FIG. 6.

Figure 8:
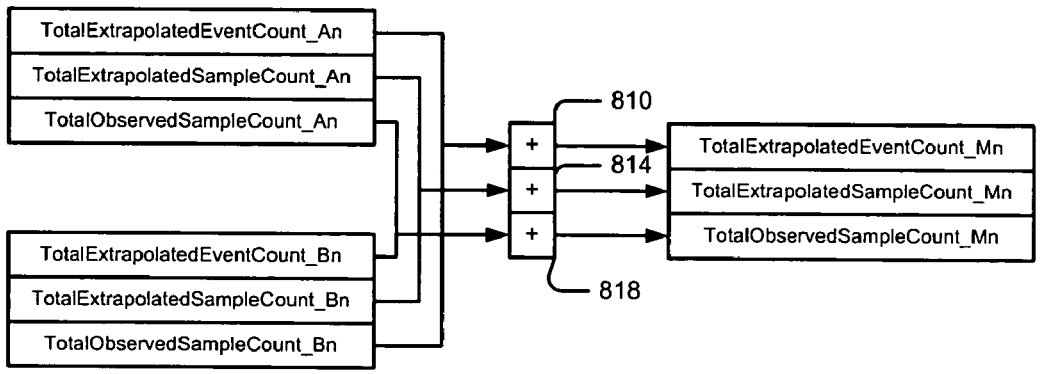
FIG. 8 is a schematic diagram illustrating operations that may be used to sample based profiling data according to one embodiment.

When collected data is converted to extrapolated counts during the data collection process merging data sets becomes a matter of simple addition. FIG. 8 is a schematic diagram illustrating operations that may be used to merge sample based profiling data according to one embodiment. In some embodiments the operations depicted in FIG. 8 may be performed for each event n for which data is collected.

Figure 9:
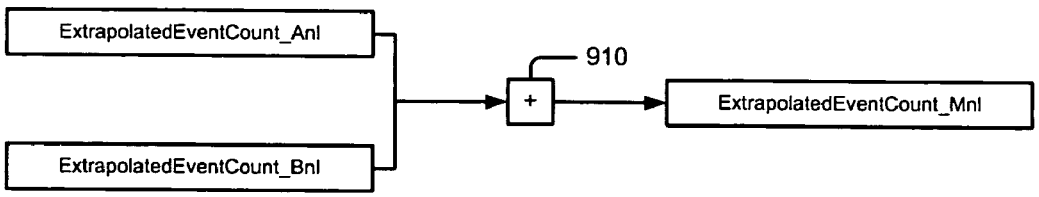
FIG. 9 is a schematic diagram illustrating operations that may be used to sample based profiling data according to one embodiment.

Referring to FIG. 8, the TotalExtrapolatedEventCount_An is added to the TotalExtrapolatedEventCount_Bn in summer 810. Similarly, TotalExtrapolatedSampleCount_An is added to the TotalExtrapolatedSampleCount_Bn in summer 814, and the TotalObservedEventCount_An is added to the TotalObservedEventCount_Bn in summer 818. Similarly, FIG. 9 is a schematic diagram illustrating operations that may be used to sample based profiling data according to one embodiment. Referring to FIG. 9, a merged extrapolated event count for a location (l) may be computed by summing the extrapolated event counts in summer 910.

The merged data set is a valid set, and can therefore be returned to persistent (e.g. disk) storage. For example, the profiler may normalize the observed sample counts of the collection as described with reference to FIG. 7, then merge the incremental data with the cumulative on-disk data, updating the on-disk database.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A non-transitory computer readable medium having instructions stored thereon that are executed by a processor to perform a method for merging sample based profiling data, comprising:
   normalizing data from a first data set comprising sample based profiling data to form a first normalized data set, wherein normalizing data from a first data includes computing extrapolated sample counts from observed sample counts and computing extrapolated event counts from observed sample counts;
   normalizing data from a second data set comprising sample based profiling data to form a second normalized data set;
   combining the first normalized data set and the second normalized data set to form a merged data set; and
   presenting a portion of the merged data set on a user interface.

2. The medium of claim 1, wherein computing extrapolated sample counts from observed sample counts comprises dividing an observed sample count by an active fraction.

3. The medium of claim 1, wherein combining the first normalized data set and the second normalized data set to form a merged data set comprises:
   computing a total observed sample count for the merged data set;
   computing a total extrapolated sample count for the merged data set; and
   computing a total extrapolated event count for the merged data set.

4. The medium of claim 3, further comprising:
   computing an interval for the merged data set; and
   computing an active fraction for the merged data set.

5. A computer system, comprising:
   one or more processors;
   a memory module communicatively connected to the one or more processors and comprising logic instructions stored on a computer readable medium which, when executed on the one or more processors configure the one or more processors to:
   normalize data from a first data set comprising sample based profiling data to form a first normalized data set, wherein the logic to normalize data from a first data set includes logic instructions that are executed to compute extrapolated sample counts from observed sample counts and compute extrapolated event counts from observed sample counts;
   normalize data from a second data set comprising sample based profiling data to form a second normalized data set;
   combine the first normalized data set and the second normalized data set to form a merged data set; and
   present a portion of the merged data set on a user interface.

6. The computer system of claim 5, further comprising logic instructions stored on a computer readable medium which, when executed on the one or more processors configure the one or more processors to divide an observed sample count by an active fraction.

7. The computer system of claim 6, further comprising logic instructions stored on a computer readable medium which, when executed on the one or more processors configure the one or more processors to:
   compute a total observed sample count for the merged data set;
   compute a total extrapolated sample count for the merged data set; and
   compute a total extrapolated event count for the merged data set.

8. The computer system of claim 7, comprising logic instructions stored on a computer readable medium which, when executed on the one or more processors configure the one or more processors to:
   compute an interval for the merged data set; and
   compute an active fraction for the merged data set.

9. A method for merging sample based profiling data, comprising:
   generating a first normalized data set comprising sample based profiling data from a computing system, wherein generating a first normalized data set includes collecting an observed sample count for at least one event, computing an extrapolated sample count from the observed sample count and computing an extrapolated event count from observed sample counts;

generating a second normalized data set comprising sample based profiling data from the computing system;

combining the first normalized data set and the second normalized data set to form a merged data set; and presenting a portion of the merged data set on a user interface.

10. The method of claim 9, wherein computing an extrapolated sample count from observed sample counts comprises dividing an observed sample count by an active fraction.

11. The method of claim 9, wherein computing an extrapolated event count from observed sample counts comprises dividing the extrapolated sample count by an interval.

12. The method of claim 9, wherein generating a second normalized data set comprising sample based profiling data from a computing system comprises:

collecting an observed sample count for at least one event;

computing an extrapolated sample count from the observed sample count; and computing an extrapolated event count from observed sample counts.

13. The method of claim 12, wherein computing an extrapolated sample count from observed sample counts comprises dividing an observed sample count by an active fraction.

14. The method of claim 12, wherein computing an extrapolated event count from observed sample counts comprises dividing the extrapolated sample count by an interval.

15. The method of claim 12, wherein combining the first normalized data set and the second normalized data set to form a merged data set comprises summing extrapolated event counts.

* * * * *

UNITED STATES PATENT AND TRADEMARK OFFICE
CERTIFICATE OF CORRECTION

| | |
|---|---|
| PATENT NO. | : 8,196,117 B2 |
| APPLICATION NO. | : 11/649464 |
| DATED | : June 5, 2012 |
| INVENTOR(S) | : David LaFrance-Linden |

It is certified that error appears in the above-identified patent and that said Letters Patent is hereby corrected as shown below:

In the Claims

In column 6, line 45, in Claim 7, delete "claim 6," and insert -- claim 5, --, therefor.

Page 1 of 1

Signed and Sealed this
First Day of October, 2013

Teresa Stanek Rea
*Deputy Director of the United States Patent and Trademark Office*